W. V. TURNER.
AUTOMATIC TRAIN BRAKE CONTROL APPARATUS.
APPLICATION FILED JULY 1, 1907.
1,130,447.
Patented Mar. 2, 1915.
5 SHEETS—SHEET 1
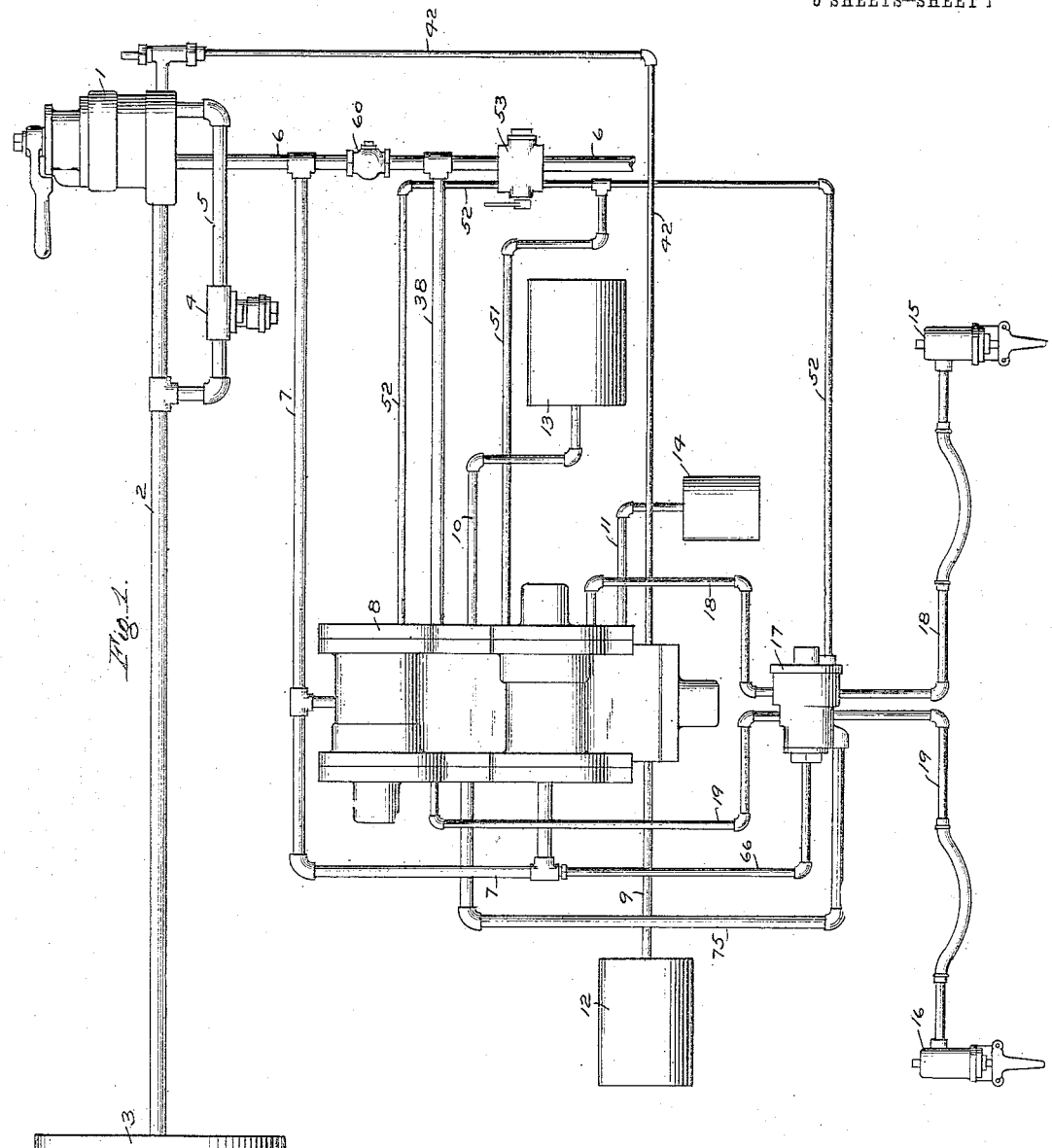
WITNESSES
Wm. M. Cady
T. S. Custer
INVENTOR
Walter V. Turner
by E. Wright
Att'y.

W. V. TURNER.
AUTOMATIC TRAIN BRAKE CONTROL APPARATUS.
APPLICATION FILED JULY 1, 1907.
1,130,447.
Patented Mar. 2, 1915.
5 SHEETS—SHEET 2.
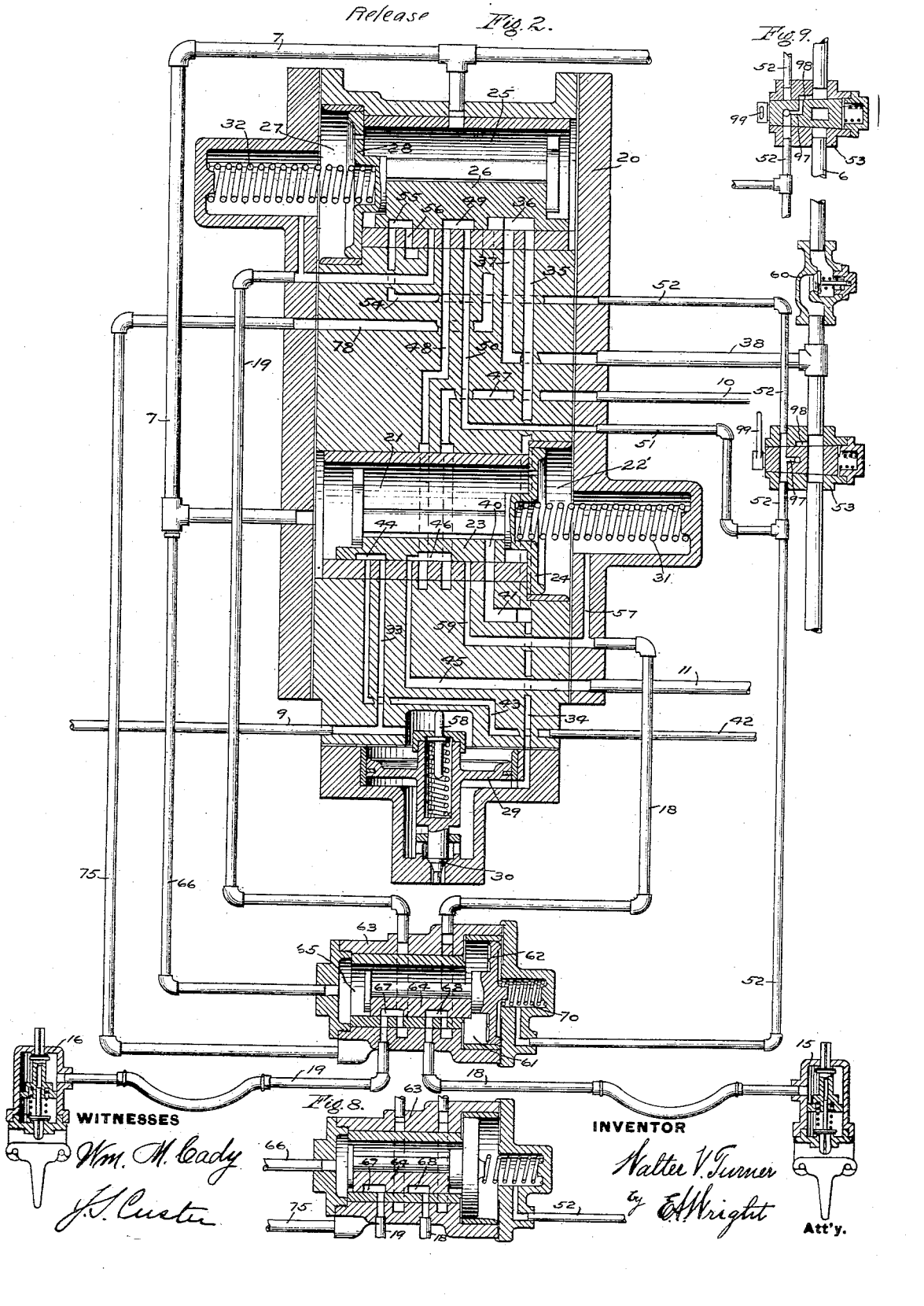

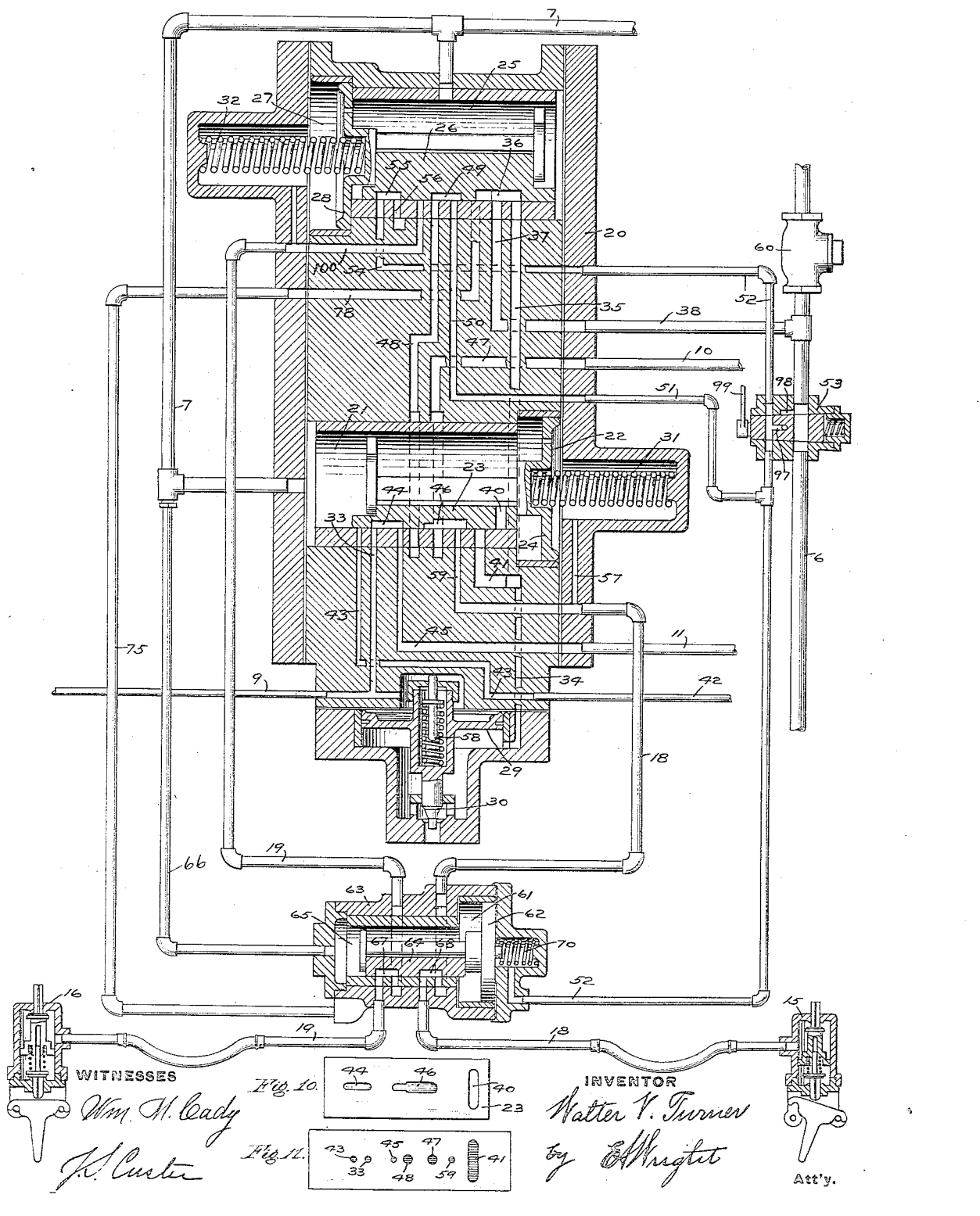

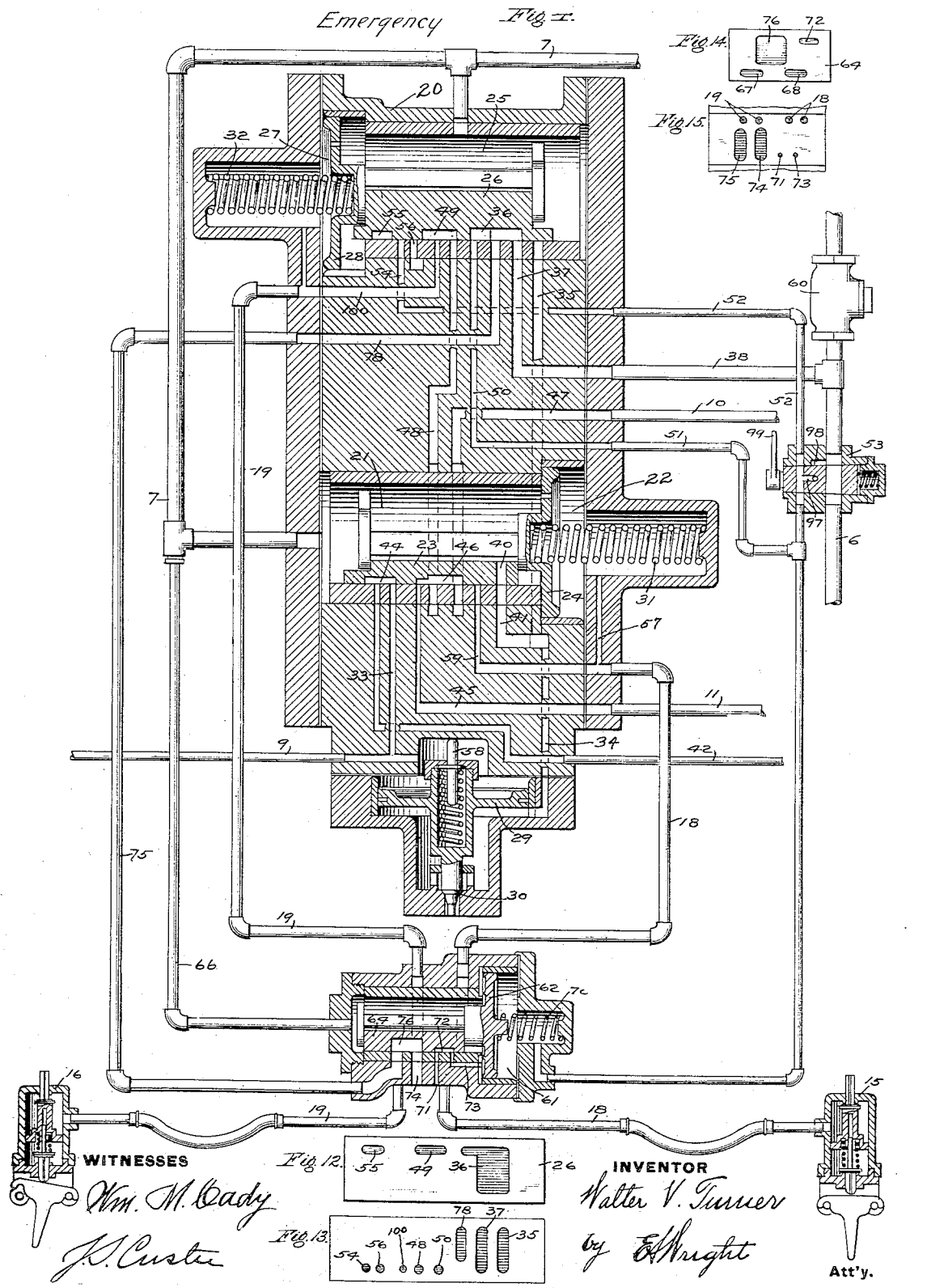

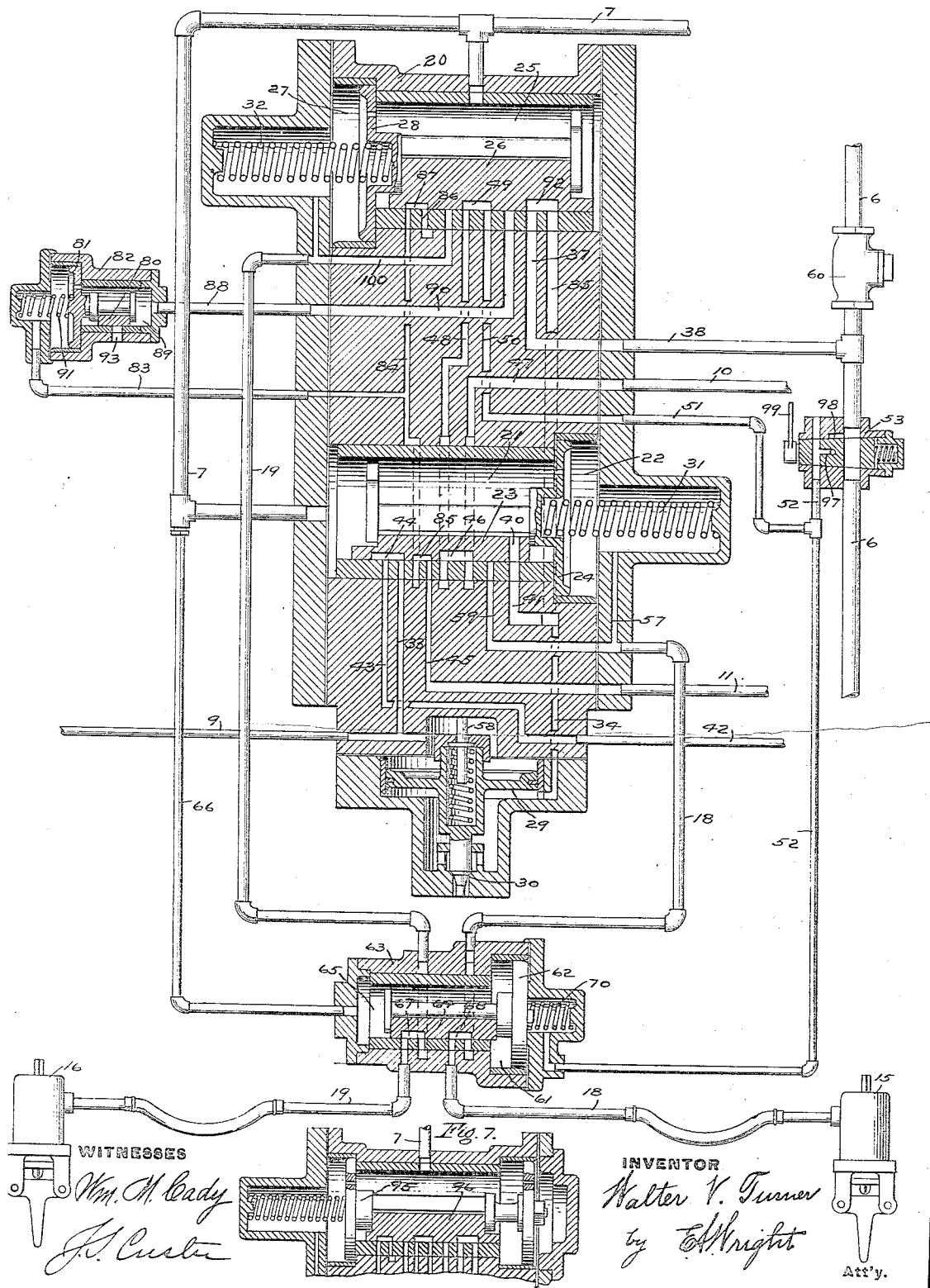

UNITED STATES PATENT OFFICE.

WALTER V. TURNER, OF EDGEWOOD, PENNSYLVANIA, ASSIGNOR TO THE WESTINGHOUSE AIR BRAKE COMPANY, OF PITTSBURGH, PENNSYLVANIA, A CORPORATION OF PENNSYLVANIA.

AUTOMATIC TRAIN-BRAKE-CONTROL APPARATUS.

1,130,447.      Specification of Letters Patent.      Patented Mar. 2, 1915.

Application filed July 1, 1907. Serial No. 381,773.

*To all whom it may concern:*

Be it known that I, WALTER V. TURNER, a citizen of the United States, residing at Edgewood, in the county of Allegheny and State of Pennsylvania, have invented new and useful Improvements in Automatic Train-Brake-Control Apparatus, of which the following is a specification.

This invention relates to automatic train brake control apparatus, wherein fluid pressure brakes are automatically governed by mechanism on the train, adapted to be set into action by a trip or like device located along the line of way, and more particularly to certain modifications and improvements with respect to an apparatus such as shown and described in my prior pending application, Serial No. 373243.

Briefly stated, my prior construction comprises, principally, a valve device adapted to effect a reduction in train pipe pressure to cause an application of the brakes, and governed by a trip actuated vent valve, adapted to vent fluid from one side of said valve device. Two such valve devices are preferably employed, one for controlling the fluid pressure variations on an equalizing discharge piston, to operate a train pipe discharge valve and cause a service application of the brakes, and the other for controlling communication from the train pipe to a vent port, preferably to a reducing chamber or reservoir, to cause an emergency application of the brakes.

My prior construction is provided with means, adapted to automatically cut off communication from the source of fluid pressure to the brake valve, when either of the automatic valve devices are operated, thereby preventing the release of the brakes by the engineer at such times.

One object of my invention is to provide a new form of means for preventing the manual release of the brakes when the automatic brake control mechanism is set in action, wherein communication from the brake valve through the train pipe is controlled by said automatic valve devices.

Another object is to provide an automatic train brake control apparatus having improved means for effecting an automatic emergency application of the brakes, wherein the train pipe is vented directly to the atmosphere, thus dispensing with a reducing reservoir, means being provided for automatically closing the train pipe vent port at a predetermined degree of reduction in train pipe pressure.

Another object is to provide means for securing a substantially uniform degree of reduction in train pipe pressure on operation of the mechanism for causing an automatic emergency application of the brakes, regardless of the length of train.

Another object is to simplify the construction of the apparatus by utilizing the same equalizing discharge valve and equalizing reservoir for operation either by manipulation of the engineer's brake valve or by automatic operation of the service valve device.

In the accompanying drawings, Figure 1 is a diagrammatic elevational view of one form of apparatus, embodying my improvements; Fig. 2 a central sectional view of a preferred construction of my automatic train brake control mechanism, showing the parts in normal release position; Fig. 3 a similar view, showing the position the parts assume, when the service trip device is operated; Fig. 4 a similar view, showing the position of the parts when the emergency trip device is operated; Fig. 5 a central sectional view of a similar apparatus, showing a somewhat modified emergency valve mechanism, with the parts in normal release position; Fig. 6 an elevational view of an engineer's brake valve and train pipe, illustrating a further modification; Fig. 7 a central sectional view of a modified form of valve device for effecting an application of the brakes; Fig. 8 a central sectional view of the cut out and vent valve device, showing the position of the valve and its actuating piston when operated to cut out the train brake control apparatus from active operation; Fig. 9 a central sectional view of the cut out cock, in its position for causing the operation of the cut out valve device; Fig. 10 a face view of the slide valve of the service valve device, showing the location of its ports and cavities; Fig. 11 a plan view of the valve seat for the above slide valve, showing the position of ports; Fig. 12 a face view of the slide valve of the emergency valve device, showing the arrangement of its cavities; Fig. 13 a plan view of the corresponding valve seat, showing the location of ports therein; Fig. 14 a face view of the slide valve of the cut off and vent valve device, showing the arrangement of cavities and Fig. 15 a plan view of the valve seat for the above slide valve, showing the location of ports therein.

According to Fig. 1, which illustrates one form of apparatus embodying my improvements, I provide an engineer's brake valve 1, connected by a pipe 2 with the usual main reservoir 3, and having a second reservoir connection, through a feed valve 4 and pipe 5. Train pipe 6 connects with said brake valve in the usual way. The apparatus further comprises a service and emergency valve mechanism 8 connected by pipes 9, 10 and 11 respectively to the equalizing reservoir 12, time reservoir 13 and reducing reservoir 14. Service and emergency trip valve mechanisms 15 and 16 are connected through the cut out and vent valve device 17, by pipes 18 and 19 respectively to the service and emergency valve mechanism 8.

For the purposes of my present improvements, the main valve mechanism for effecting automatic applications of the brakes, may be similar to that shown in my prior application, hereinbefore mentioned, and accordingly, comprises a valve casing 20, having a valve chamber 21 and piston chamber 22, containing a slide valve 23 and its actuating piston 24 for effecting automatic service applications of the brakes. The service valve device controls a train pipe discharge valve 30, having an actuating piston 29, one face of which is open to an equalizing reservoir 12, by way of the pipe 9, and to the service valve seat, through a passage 33, and the other or discharge valve side of said piston, is open to the train pipe through a passage 34, passage 35, cavity 36 in the emergency slide valve 26, passage 37 and pipe 38, which leads to the train pipe 6.

In my aforesaid prior application, the service valve device is shown as connected to the main reservoir pipe leading to the engineer's brake valve, so that the actuating piston is subject to main reservoir pressure, but in the present case, I employ fluid at train pipe pressure, and for this purpose valve chamber 21 is connected by a pipe 7 with the train pipe 6. The piston 24 is provided with an equalizing port, and a spring 31 is employed to maintain said piston and the valve 23 in their inner position, when the piston is balanced as to fluid pressure. In the inner position, as shown in Fig. 2, the service slide valve 23 establishes communication between the discharge valve face of the piston 29 and the train pipe, by way of valve chamber 21, port 40 in the service valve 23, and passage 41 which opens into the passage 34, leading to the train pipe.

In the present construction, the train pipe discharge valve device and equalizing reservoir of the automatic brake control apparatus, are employed as corresponding parts of the usual engineer's brake valve, thereby doing away with an additional discharge valve and reservoir for the brake valve. For this purpose, pipe 42 is connected to the usual equalizing reservoir pipe connection of the brake valve, and a passage 43 is provided in the casing 20, which opens into pipe 42 and leads to the service valve seat. In the inner position of the service valve device, a cavity 44 in the slide valve 23 connects passage 43 with passage 33, leading to the outer face of the equalizing discharge piston 29 and equalizing reservoir 12. Thus, when the service valve 23 is in the inner position, the discharge valve 30 is governed by the usual movements of the engineer's brake valve, to secure a gradual reduction in train pipe pressure. As in my prior application, the reducing reservoir 14 and time reservoir 13 are normally open to the atmosphere, and preferably as follows: from reducing reservoir 14 to pipe 11, passage 45, cavity 46, in the service valve 23, and from time reservoir 13 to pipe 10, passage 47, also to cavity 46, thence to passage 48, cavity 49 in the emergency valve 26, passage 50, pipe 51, pipe 52, through the cut out cock 53, passage 54, cavity 55 in emergency valve 26, to exhaust port 56.

The operation of the apparatus, so far described, is as follows: The service trip valve mechanism 15, which may be of the same construction as that in my prior application, or other suitable trip operated vent valve, being actuated by the track trip, fluid is vented from the outer face of the service piston 24, through passage 57, pipe 18 to vent valve mechanism 15. The preponderating fluid pressure on the inner face of the piston 24 thereupon shifts the piston 24 and service valve 23 to their extreme outer position. In this position, as shown in Fig. 3, the cavity 44 connects the passage 33 leading to the equalizing reservoir and outer face of the equalizing discharge piston 29, with the passage 45, leading to the reducing reservoir 14. Fluid in the equalizing reservoir and on the outer face of the piston 29 thereupon flows to the reducing reservoir, effecting a reduction in fluid pressure, according to the predetermined volume of the reducing reservoir. The train pipe pressure on the inner face of the piston will then shift the piston and open the discharge valve 30, venting fluid from the train pipe 6 through pipe 38, passage 37, cavity 36 in the emergency slide valve 26, passage 35 and passage 34, which opens to the discharge valve chamber. The train pipe pressure will then be reduced until substantially equal to the pressure above the piston 29, when the spring device 58 moves the piston 39 and valve 30 and closes the discharge port. A service application of the brakes is thus produced. In the meantime, the fluid under pressure on the inner face of the service piston 24 flows through the equalizing port therein. As in the prior application, a time reservoir 13 is open to the outer face of the piston 24 in this position, through passage 57, passage 59, cavity 46 in the service valve 23, passage 47 and pipe 10, which leads to the time reservoir 13. It will therefore be seen that a certain time elapses before the fluid pressure becomes equalized on the opposing faces of the piston 24, according to the predetermined volume of the time reservoir. The fluid pressure having equalized, the spring 31 shifts the piston 24 and valve 23 to their inner position. On return of piston 24 and service valve 23 to the inner position, communication is established by port 40 in the valve 23 between valve chamber 21, which is open, through pipe 7, to the brake valve and passage 41 to the train pipe, as before described, so that fluid from the brake valve is admitted to the train pipe, and the brakes are automatically released. It will be noted that in the outer position of the valve 23, port 40 is out of register with passage 41, so that communication is closed between the train pipe and brake valve through the valve mechanism.

According to one construction, as shown in Figs. 2 to 5 inclusive, a check valve 60 is provided in the train pipe section intermediate the pipes 7 and 38, which is adapted to prevent flow from the brake valve to the train pipe, so that the engineer cannot admit air to the train pipe and release the brakes while the service valve device is in its outer position. The check valve may in some cases be dispensed with as shown in Fig. 6, wherein there is no direct train pipe connection between the brake valve and train pipe.

In my prior application, the emergency valve device controls a train pipe vent port to a reducing reservoir, which, being of fixed volume, necessarily caused a different degree of train pipe reduction according to the length of the train. In my present construction means are provided for obtaining a substantially uniform reduction in train pipe pressure, regardless of the length of the train, and comprises a valve device, subject to train pipe pressure, for controlling the emergency vent port.

The emergency valve device comprises the slide valve 26, contained in valve chamber 25, and actuating piston 28, contained in piston chamber 27. The valve chamber 25 is in open communication with pipe 7, leading to the train pipe. The piston 28 has an equalizing port, so that said piston is normally balanced as to fluid pressure, and a spring 32 is employed to then maintain said piston and slide valve in their inner position. The outer face of the piston 28 is connected by a pipe 19 to the emergency vent valve mechanism 16.

The valve device for obtaining a uniform degree of reduction in train pipe pressure in emergency applications may be a separate mechanism, but I preferably adapt the cut out valve device for this purpose, for the sake of simplicity and compactness. As shown in the drawings, the cut out and vent valve device comprises a casing 63 having a valve chamber 65, containing the slide valve 64, and a piston chamber 61, containing the actuating piston 62. The valve chamber 65 is open to fluid at train pipe pressure, being connected by a pipe 66 to the pipe 7, leading to the train pipe. The outer face of the piston 62 is normally open to the atmosphere, the piston chamber 61 being in communication with pipe 52, which leads to passage 54, through the cut out cock 53, and thence through cavity 55, in the emergency valve 26, to exhaust port 56. Thus fluid pressure normally maintains the piston 62 and slide valve 64 in their outer position, compressing a spring 70, which tends to move said piston to its inner position. In the inner position of the emergency valve 26, a passage 78, leading to the valve seat, is closed. This passage opens into a pipe 75 leading to a port in the valve seat of the cut out valve 64, which is also closed at this time. On actuation of the emergency trip valve mechanism 16 by a track trip, fluid is vented from the outer face of the emergency piston 28. Train pipe pressure on the inner face of said piston thereupon shifts the same and emergency valve 26 to the extreme outer position. In this position, as shown in Fig. 4, communication is established between the train pipe and the outer face of the cut out and vent valve piston 62 as follows: from train pipe 6 to pipe 38, passage 37, cavity 36, in the emergency valve 26, passage 50, pipe 51 and pipe 52 to the piston 62. The consequent equalization of fluid pressure on the piston 62 allows spring 70 to shift said piston and the valve 64 to their extreme inner position, in which the piston seats on a gasket. In order to assist in maintaining the piston 62 on its seat, I preferably provide a vent port 71, which is connected in this position with a passage 73, leading to the piston seat, by a cavity 72 in the valve 64, so that part of the piston area is under atmospheric pressure. In this inner position, communication is opened between an exhaust port 74 and pipe 75, through a cavity 76 in the valve 64. Pipe 75 is connected to the train pipe through cavity 36 in the emergency valve 26, which, at this time, establishes communication between passages 78 and 37, leading respectively to pipes 75 and 38. Air from the train pipe is thus vented to the atmosphere, causing an emergency application of the brakes. When the train pipe pressure has become reduced to a degree which, together with that of the spring 70, is slightly less than the fluid pressure acting on the exposed area of the opposite face of the piston, said piston 62 is shifted and valve 64 closes the vent port 74. Thus a substantially uniform train pipe reduction is obtained without regard to the length of the train. In the outer position of the emergency valve 26, the piston chamber 27 and outer face of the piston 28 are open to both the time and reducing reservoirs, through a passage 100, leading to pipe 19, and connected by cavity 49 in the emergency valve 26, with a passage 48, leading to the time and reducing reservoirs as before described. The emergency piston is thus maintained in its outer position, until the fluid pressure has substantially equalized through the equalizing port in said piston, to the reservoirs. The piston 28 and valve 26 then return to their inner position. While the emergency valve 26 is in its outer position, communication is cut off between the brake valve and train pipe, by the shifting of cavity 36, so that, as in the operation of the service valve device, the brakes cannot be manually released in this position When the piston 28 and the emergency valve 26 return to their inner position communication is opened through cavity 36 between passages 35 and 37, which connect the brake valve with the train pipe, as before described, and the brakes are automatically released.

In Fig. 5 I have illustrated another form of valve device for controlling the emergency venting of the train pipe, wherein is provided a valve 80 and actuating piston 81, contained in a casing 82 or embodied in the main valve casing if desired. The outer face of the piston 81 is connected by a pipe 83 to passage 84, which communicates through a cavity 85 in the service valve 23 with passage 45 and pipe 11, leading to the reducing reservoir 14. The passage 84 is also connected to an exhaust port 86 by a cavity 87 in the emergency valve 26, so that normally the outer face of the piston 81 is at atmospheric pressure. A pipe 88 opening into the valve chamber 89 of the vent valve mechanism communicates with a passage 90 leading to the emergency valve seat. As the piston is provided with an equalizing port, both sides of the piston are normally at atmospheric pressure, allowing a spring 91 to maintain said piston at its inner position. Otherwise the construction is similar to that shown in Figs. 2, 3 and 4, except that the outer face of the cut out piston 62 is open to a direct exhaust port, controlled by the cut out cock 53, through pipe 52, so that the cut out piston does not move in the emergency operation. Time reservoir 13 may also be connected to the same exhaust port, the other ports and passages being substantially the same as before described.

In operation, when piston 28 and valve 26 are in the outer position, passage 90 is connected to passage 37, leading to pipe 38 and the train pipe, by a cavity 92 in the emergency slide valve. Fluid at train pipe pressure then moves piston 81 and valve 80 to their outer position, in which a vent port 93 is uncovered. Fluid is thereupon vented from the train pipe, causing an emergency application of the brakes. In the outer position of the emergency valve 26, communication is cut off between the passage 84 and the exhaust port 86, and the piston 81 is maintained in its outer position until the fluid pressure becomes equalized on the outer face of said piston and in the reducing reservoir 14, which is connected to passage 84, spring 91 then returns the piston and valve 80 to the inner position, closing the train pipe vent port 93. As described in connection with Figs. 2, 3 and 4, the communication between the brake valve and train pipe is cut off on movement of the emergency valve to its outer position, preventing the manual release of the brakes. The emergency valve also establishes communication between the piston chamber 27 and the time reservoir, by way of the cavity 49, which connects the passage 48 leading to cavity 46 in the service valve 23, passage 47, and pipe 10 to the time reservoir, with passage 100 leading to pipe 19 and the piston chamber 27. It is therefore apparent that the piston 28 will be held to its outer position until the fluid pressure has substantially equalized through the equalizing port in the piston 28, the time depending on the volume of the time reservoir. After equalization, the spring 32 returns the piston 28 and valve 26 to their inner position, in which the communication from the brake valve to the train pipe is again established through cavity 92, so that the brakes are automatically released by the flow of air from said brake valve to the train pipe. The cavity 87 connects the time reservoir passage 84 to the exhaust port 86, and cavity 49 connects passage 48, leading to the reducing reservoir, to the exhaust port in pipe 52, so that both reservoirs are reduced to atmospheric pressure. When an application of the brakes is made by manipulation of the brake valve, the fluid pressure is reduced to the corresponding train pipe pressure in the chambers of the automatic valve mechanism, and it may happen, when the pressure is then increased to release the brakes, that a sufficient difference of pressure will be caused on the pistons of the service and emergency valve devices, to move them from their normal inner positions. In order to avoid the above, I may construct the valve devices with double head pistons, as shown in Fig. 7, wherein the actuating piston 95 for the slide valve 96 has two heads. In this case, the train pipe 7 is open to the space between the heads. The train pipe pressure will thus be balanced as to the piston, and changes in pressure will not effect a movement of the piston, while responsive as in the first described construction, to the venting of fluid pressure from the outer face of one piston head. In order to cut out the automatic brake control apparatus from active operation a cut out valve mechanism is provided as in my prior application. The main parts of said cut out valve have already been described in connection with the vent valve operation. In the slide valve 64 are cavities 67 and 68, which in the normal outer position of the cut out valve establish communication through the respective emergency and service control pipes 19 and 18.

In operation, as before stated, the inner face of the piston is subject to train pipe pressure and the outer face is normally open to the atmosphere, either by way of exhaust port 56, governed by the emergency valve, or the exhaust port in pipe 52, controlled by the cut out cock 53. When it is desired to cut out the brake control mechanism, the cock handle 99 is turned to a position, in which a port 97 is connected with a port 98 leading to the train pipe 6, as shown in Fig. 9. Train pipe air is then supplied to the outer face of the piston 62. The pipe 51 which is open to pipe 52 leads to the time reservoir 13 and the reducing reservoir 14 by passages as hereinbefore described, so that the piston 62 does not move until the fluid from the train pipe has raised the pressure in said reservoirs and on the piston 62 sufficiently to substantially equalize with the fluid pressure on the opposite face of the piston, then the spring 70 is effective to shift the piston and cut off the communication from the trip valve mechanism to the pipes 18 and 19, which lead to the outer faces of the service and emergency valve pistons respectively. Thus, as described in my prior application, it is impossible for the engineer to so time the operation of the manual cock 53 as to pass a trip along the track with the apparatus in an inactive condition, while he will still be able to cut out the apparatus in cases of necessity, as in double heading, or in switching operations.

Having now described my invention, what I claim as new and desire to secure by Letters Patent is:

1. In an automatic train brake control apparatus, the combination with a brake valve and train pipe, of a valve mechanism subject to train pipe pressure for effecting service and emergency applications of the brakes, and means governed by said valve mechanism for controlling communication from the brake valve through the train pipe.

2. An automatic train brake control apparatus, comprising a valve mechanism for controlling a train pipe vent port, of a valve device operated by fluid pressure for closing said vent port, upon a predetermined reduction in train pipe pressure.

3. An automatic train brake control apparatus, comprising a valve mechanism for controlling a train pipe vent port, of a valve device operated by fluid at train pipe pressure for closing said vent port, upon a predetermined reduction in train pipe pressure.

4. An automatic train brake control apparatus, comprising a valve mechanism for controlling a train pipe vent port, of a valve for governing said train pipe vent port, and an actuating piston, subject on one side to a spring and operated by a reduced train pipe pressure to close said vent port.

5. An automatic train brake control apparatus, comprising a valve mechanism for controlling a train pipe vent port, and means controlled by fluid at train pipe pressure for closing said vent port, said valve mechanism being adapted to govern the admission of fluid at train pipe pressure to said means.

6. An automatic train brake control apparatus, comprising valve mechanism for controlling a train pipe vent port, and a valve for governing said train pipe vent port, an actuating piston therefor, normally subject to the opposing pressures of the train pipe and a spring, said valve mechanism being adapted to admit fluid at train pipe pressure to the spring side of said piston, to open said vent port, and means for closing said vent port valve at a predetermined reduction in train pipe pressure.

7. An automatic train brake control apparatus, comprising a brake valve having means for controlling the admission and release of fluid to and from the train pipe and a valve mechanism for also controlling the supply of air to the train pipe and a train pipe vent port to the atmosphere and means operated by train pipe pressure for opening and then closing said vent port.

8. An automatic train brake control apparatus, comprising a valve for effecting an application of the brakes, an actuating piston therefor, having two heads with a fluid pressure supply communication opening to the space intermediate said heads, means normally equalizing the fluid pressure on said heads and a valve for varying the pressure on one side of said piston to actuate said valve.

9. An automatic train brake control apparatus, comprising a valve for effecting an application of the brakes, an actuating piston therefor, having two heads, and open intermediate said heads to fluid at train pipe pressure, means normally effecting equalization of fluid pressure on said heads and a valve for venting fluid from one side of said piston to actuate said valve, and a spring for returning said valve to normal position.

10. In an automatic train brake control apparatus, the combination with a train pipe, of a valve for releasing air from the train pipe, a piston for actuating said valve, a valve adapted to vent air from said piston to operate said release valve and thereby exhaust air from the train pipe, and means for operating said piston and valve to cut off the exhaust of air from the train pipe, upon a predetermined reduction in train pipe pressure.

In testimony whereof I have hereunto set my hand.

WALTER V. TURNER.

Witnesses:
R. F. EMERY,
WM. M. CADY.